United States Patent
Hodder et al.

(10) Patent No.: US 7,583,393 B2
(45) Date of Patent: Sep. 1, 2009

(54) MULTIPLE FONT MANAGEMENT SYSTEM AND METHOD

(75) Inventors: Leonard B. Hodder, Toronto (CA); Alan Pak-Lun Ho, Unionville (CA); Chunguang Li, Scarborough (CA)

(73) Assignee: Seiko Epson Corporation, Tokyo (JP)

( * ) Notice: Subject to any disclaimer, the term of this patent is extended or adjusted under 35 U.S.C. 154(b) by 1019 days.

(21) Appl. No.: 10/949,870

(22) Filed: Sep. 24, 2004

(65) Prior Publication Data

US 2006/0072136 A1  Apr. 6, 2006

(51) Int. Cl.
*G06F 15/00* (2006.01)
*G06T 11/00* (2006.01)

(52) U.S. Cl. ............... 358/1.11; 358/1.12; 358/1.13; 358/1.14; 358/1.16; 345/467; 345/469; 345/471; 345/472

(58) Field of Classification Search ....... 358/1.11–1.14, 358/1.16; 345/467, 471, 472, 469
See application file for complete search history.

(56) References Cited

U.S. PATENT DOCUMENTS

| 4,353,653 | A | | 10/1982 | Zimmerman |
| 5,233,685 | A | | 8/1993 | Landes et al. |
| 5,416,989 | A | * | 5/1995 | Preston ............... 36/108 |
| 5,742,298 | A | | 4/1998 | Bril et al. |
| 5,761,395 | A | * | 6/1998 | Miyazaki et al. ........ 358/1.11 |
| 5,877,776 | A | | 3/1999 | Beaman et al. |
| 5,999,706 | A | | 12/1999 | Chrosny |
| 6,490,051 | B1 | | 12/2002 | Nguyen et al. |
| 6,675,358 | B1 | | 1/2004 | Kido |
| 6,901,427 | B2 | * | 5/2005 | Teshima ............... 709/203 |
| 6,985,146 | B2 | * | 1/2006 | Shade et al. ............ 345/467 |
| 2002/0085006 | A1 | | 7/2002 | Shade et al. |
| 2002/0099867 | A1 | | 7/2002 | Wilkinson et al. |
| 2003/0217329 | A1 | | 11/2003 | Good |

* cited by examiner

*Primary Examiner*—Chan S Park (57) ABSTRACT

A multiple font management system and method in a printing device for activating multiple fonts is provided for enabling base font localization and font patching for print jobs to reduce the need to upload entire fonts in order to provide localized receipts or to provide corrections to partially-corrupted font tables. A font access level stores locations of activated base, localization and patch fonts and are referenced in an access order during character retrieval so as to apply retrieval priority to patches and localizations. A font storage level maintains multiple tier character indices for referencing character shape data in order to provide faster character searching through each of the multiple activated fonts than a single-level index.

15 Claims, 9 Drawing Sheets

MULTIPLE FONT MANAGEMENT SYSTEM AND METHOD

FIELD OF THE INVENTION

The present invention relates generally to printing devices and in particular, to a method and system for managing multiple fonts in a printing device.

BACKGROUND OF THE INVENTION

Stand-alone electronic cash registers including payment card readers and receipt printers have been used for years in stores, retail outlets and service outlets to facilitate the completion of cash, cheque, credit card or debit card transactions for the purchase of goods and/or services. With the advent of sophisticated and inexpensive computing equipment, input devices and secure communication networks, point-of-sale (POS) stations have become an increasingly popular alternative.

POS stations typically include a host device and a plurality of interchangeable peripherals connected to the host device. The host device and peripherals are easily integrated allowing the configuration of POS stations to be modified to meet changing needs. This has been another factor leading to their widespread acceptance. The host device is commonly in the form of a personal computer. The peripherals often include a keyboard, a display screen, a cash drawer, a printing device, a payment card reader and a barcode reader. In some cases, a touch-sensitive display screen is used instead of separate keyboard and display screen peripherals.

As is well known, the host device communicates with the peripherals and executes software to allow product and/or service transactions to be completed. When payment is effected using a debit or credit card, the host device establishes a connection to the appropriate financial institution over an information network so that approval for the transaction may be obtained. Upon completion of any transaction, the host device signals the printing device causing the printing device to generate a transaction receipt and a possibly signing receipt, if payment is made using a credit card.

In larger stores, retail outlets and service outlets, POS stations are typically linked via a local area network and communicate with a backend computing device that maintains a database for transaction, inventory, accounting, sales, tax, etc. information. Transaction data received by each of the POS stations is conveyed to the backend computing device for storage in the database allowing all transaction data to be stored in a common location. Collectively storing all transaction data in one common location allows retailers to track, account for and maintain inventory, collected taxes and pricing information. Also, by linking the POS stations, updates relating to sales on products and/or services, tax, etc. can be communicated to each POS station over the local area network avoiding the need to update the POS stations one at a time.

Printing devices commonly used in POS stations comprise a printer having a slot for receiving a separate printer interface that controls communications between the host device and the printer. The printer interface is primarily selected based on the communication protocol used by the host device thereby to ensure hardware compatibility between the host device and the printer. For example, hardware compatibility may be achieved by installing a serial, parallel, Ethernet or USB interface. As the printer interface can be readily changed, the printer is not limited for use with any particular communication protocol but rather can be used in many different communication protocol environments simply by replacing the printer interface. The printer interface may also be selected to enhance functionality of the printer such as by adding supplemental fonts or by emulating one or more other printer models.

The printer interface and the printer are typically preloaded with firmware although the printing device may receive updated printer firmware from the host device to replace or patch the existing printer firmware. The printer firmware stored in the printer interface is in turn conveyed to the printer for storage therein. The printer firmware typically includes a boot file, a main firmware file and one or more font files. The boot file is executed by the printer during initialization to place the printer into a ready operating state. The main firmware and font files are executed during normal operation of the printer to allow the printer to respond to print commands received from the host device via the printer interface so that appropriate transaction receipts can be printed. A font encompasses a specific set of characters that are designed to have a certain look or style. The font file typically contains glyph or shape data for each character in the font file character sets.

In many instances it is desired to update the printer firmware stored in the printer to allow the printing device to print receipts in different formats and/or languages, to support additional functionality and/or to enhance printer performance. For instance, a customer from a particular locale may be more comfortable reading a receipt with one or more characters in the customer's language localized according to the customer's locale. In order to achieve this, it is known to store an entire localized font file containing mostly the standard language characters and select modified characters on the printing device, and to access all characters for the receipt from the localized font file. However, the printing device must have enough memory to store the additional localized font file, or replace the original font file effectively limiting receipt printing to localized characters. Furthermore, due to font file sizes, it can be time consuming to download an entire font file.

The same disadvantages accrue when errors are discovered in one or more characters of a font, because known methods involve replacing the font file containing the errors with a complete, corrected font file.

As a result, a number of techniques for managing multiple fonts in a printing device have been considered. For example, U.S. Pat. No. 4,353,653 to Zimmerman discloses a printer subsystem for storing a large number of compressed font files that is intended to increase the number of fonts available to a user and increase font use flexibility by enabling rapid switchover between fonts. The printer is loaded with a base font image set that can be replaced by other font images. At column 36 and FIG. 58, Zimmerman discloses storage of fonts and font reference data in groups of tables. The tables include a Multinational Master Table for storing multiple character images, a Major Country Table for storing changes to the Multinational Master Table, and a Modification to Master Table for storing moves of characters in the master table from one location to another. A register stores bits for signalling whether the Multinational master table is to be overlaid with a major country entry or a modification country entry. Zimmerman shows an example of loading a font from a different country into RAM for use by the printer in response to receipt of a control sequence.

U.S. Patent Application Publication No. 2002/0099867 to Wilkinson et al. discloses a portable operating environment for information devices. A primary character subset, along with characters from secondary subsets are defined (font extensions) for localization purposes (see paragraphs [0084]

to [0087]). A font extension may be linked to several font instances, and loaded on demand.

Although the above references describe multiple-font management methods, as will be appreciated, they merely enable a print device to effectively extend a font's character set. As a result, a host device must be aware of the characters available in a particular extension font and specify the correct font in print command sequences. The references do not address the problem of correcting or localizing characters in an existing font.

It is therefore an object of the invention to provide a novel method of managing multiple fonts in a printing device, and a system implementing the method.

SUMMARY OF THE INVENTION

Accordingly, in one aspect of the invention there is provided a method of managing multiple fonts in a printing device comprising activating a first font by storing the location of the first font in a first font access variable being first in a font access order; and activating a second font by storing the location of the second font in a second font access variable being second in the font access order. Subsequent accesses to characters at the font locations is conducted in accordance with the access order of the font access variables.

By providing a method of managing multiple fonts in which multiple fonts may be activated, a localization font or font patch containing only localized characters or patched characters, rather than an entire character set, may be downloaded to the printing device and subsequently accessed by a host device during a print job without the host device specifying a change in font.

In another aspect of the invention there is provided a method of accessing a character in a printing device in which multiple fonts are activated. The method comprises searching a first font being first in a font access order for the character; and in the event that the character is not in the first font, automatically searching a second font being second in the font access order for the character.

Preferably, additional fonts being third and fourth in the font access order may be activated to provide additional localization or patching flexibility.

In yet another aspect of the invention there is provided a system for managing multiple fonts in a printing device. The system comprises a font access level having memory for storing font locations of activated fonts according to a font access order, and a microprocessor readable access program for accessing characters in the activated fonts in the font access order. The system also comprises a font storage level having memory for storing the activated fonts.

The font table memory comprises font tables which each preferably have a font header, character shape data and a multiple-tier character index for facilitating character searches.

The font management method and system provides advantages in that localized fonts and font patches can be provided to a printing device without the lengthy and memory-intensive download of an entire font set. Thus, character adjustments can be provided to a printing device in a shorter period of time and with less memory than prior art methods. When character shape data is required for a print job, the preferred multiple-tier character index in font tables is space-efficient and also increases lookup speed. This increase in lookup speed provides the advantage that in the event that multiple fonts must each be searched for a particular character, the lookup speed is faster than if each font had a single-tier character index with all entries.

BRIEF DESCRIPTION OF THE DRAWINGS

Embodiments will now be described more fully with reference to the accompanying drawings in which.

DETAILED DESCRIPTION OF THE EMBODIMENTS

Figure 1:
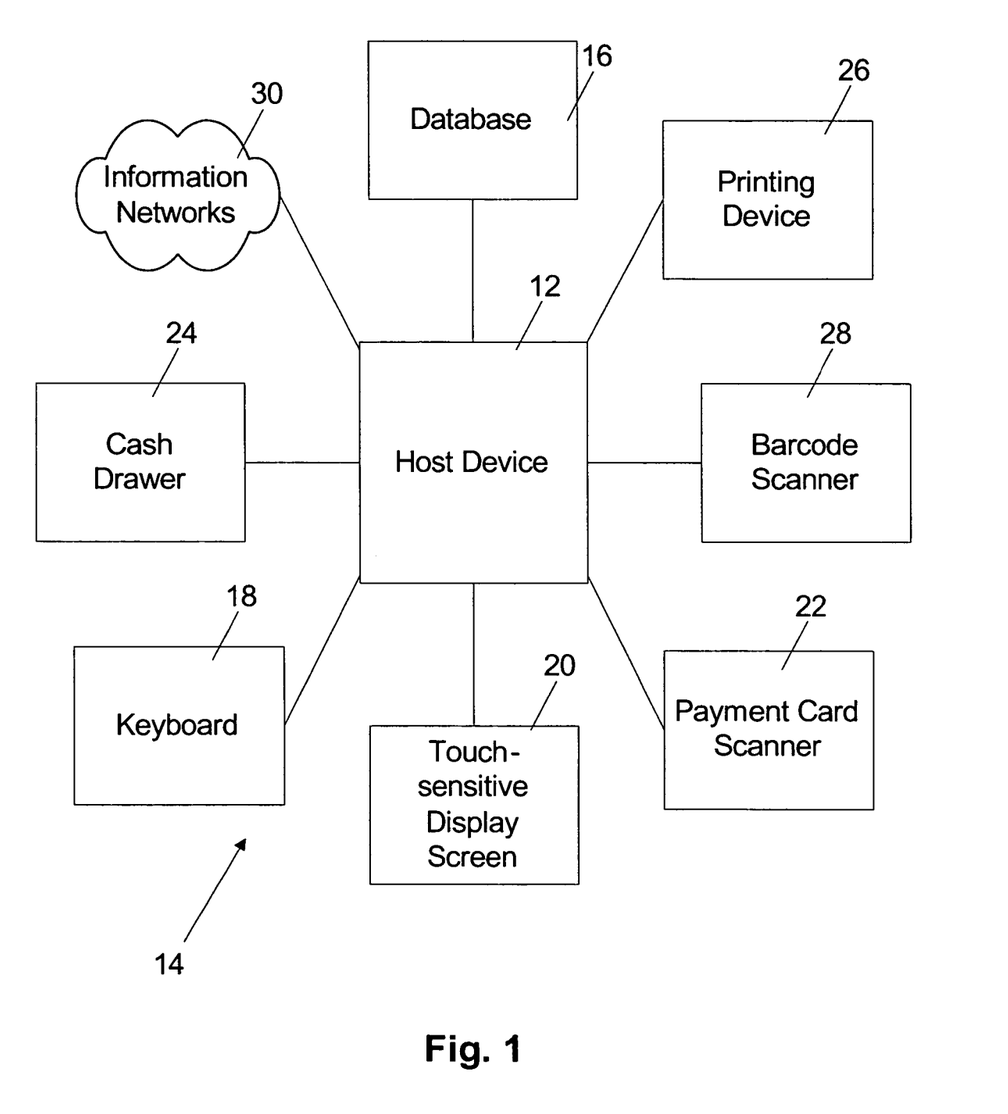
FIG. 1 is a schematic block diagram of a point-of-sale station including a printing device.

Turning now to FIG. 1, a point-of-sale (POS) station is shown and is generally identified by reference numeral 10. As can be seen, POS station 10 includes a microprocessor-based host device 12 in the form of a personal computer that communicates with a plurality of peripherals generally identified by reference numeral 14 and with a database 16 storing transaction, inventory, pricing, tax and accounting information. In this example, peripherals 14 include a keyboard 18, a touch-sensitive display screen 20, a payment card scanner 22, a cash drawer 24, a printing device 26 and a barcode scanner 28. Host device 12 also communicates with financial institutions (not shown) such as banks and credit card companies over one or more information networks generally identified by reference numeral 30.

Figure 2:
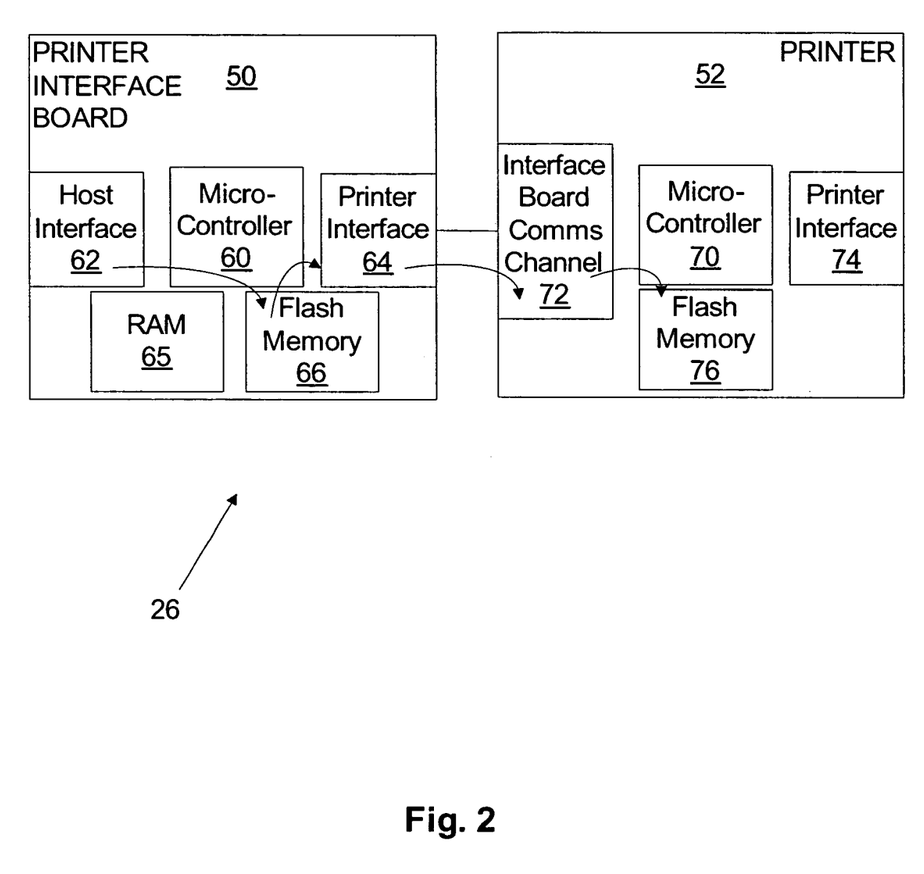
FIG. 2 is a schematic block diagram of the printing device of FIG. 1.

Printing device 26 is best illustrated in FIG. 2 and includes a printer interface 50 and a printer 52. Printer interface 50 comprises a microcontroller 60, a host interface-board 62, a printer interface board 64, RAM 65 and non-volatile flash NAND memory 66. Printer 52 comprises a microcontroller 70, a communications channel interface board 72, a printer control mechanism 74 and non-volatile flash NAND memory 76. For example, the printer interface 50 may be of the type sold by EPSON under model No. UB-EML and printer may be of the type sold by EPSON under model No. TM-U200.

The non-volatile memory 66 stores printer interface firmware that is executed by the microcontroller 60 during initialization and operation of the printing device 26 to permit communications between the host device 12 and the printer 52 and optionally to enhance operation of the printer by storing supplemental font files that allow the printer to print different font-type characters and/or emulation files that allow the printer to emulate one or more other printer models.

Figure 3:
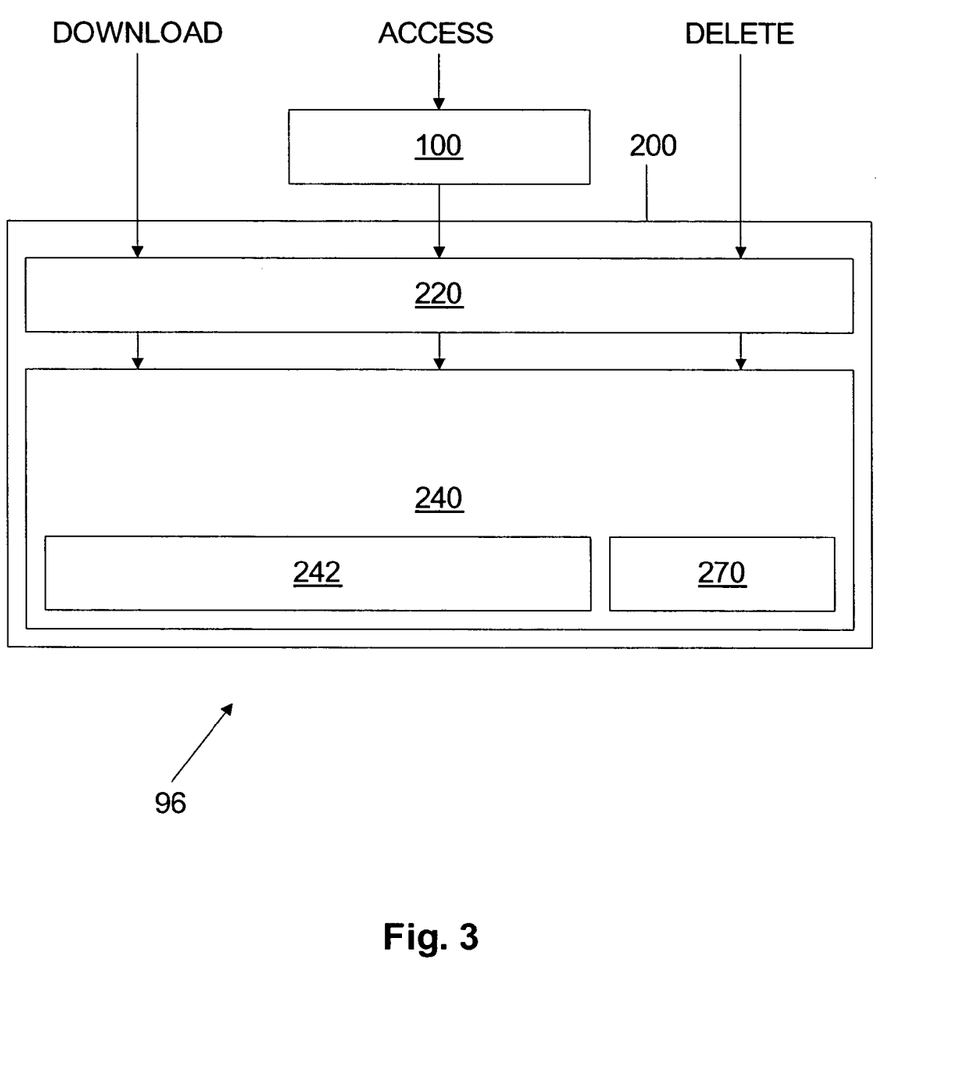
FIG. 3 is a schematic block diagram of a multiple-level font management system on the printing device including a font access level, a font listing level and a font table level.

FIG. 3 is a schematic block diagram of the font management system of the invention, generally designated by reference numeral 96. Font management system 96 is implemented in non-volatile memory 66 on printer interface 50, and comprises a font access level 100 and a font storage level 200. Font access level 100 provides access to multiple activated fonts and is used by printer interface 50 during font selection and activation, and accessing character data in activated fonts. Basic font reading, writing and deletion is provided by font storage section 200, which comprises both a font listing level 220 and a font table level 240.

Font listing level 220 of font storage level 200 stores locations of fonts in font table level 240 and is used by printer interface 50 when fonts are selected, activated and downloaded from host device 12 and deleted from font storage section 200.

Font table level 240, comprising font table storage 242 and NAND Sector Processing Data 270, stores fonts and sector processing data and is used by printer interface 50 when fonts are selected, activated, downloaded from host device 12 and deleted from font storage section 200. Font table level 240 is also used during character access such as character searches and character shape data retrieval.

The features of the system shown in FIG. 3 that support the font selection, activation, and character access processes will now be described.

Figure 4:
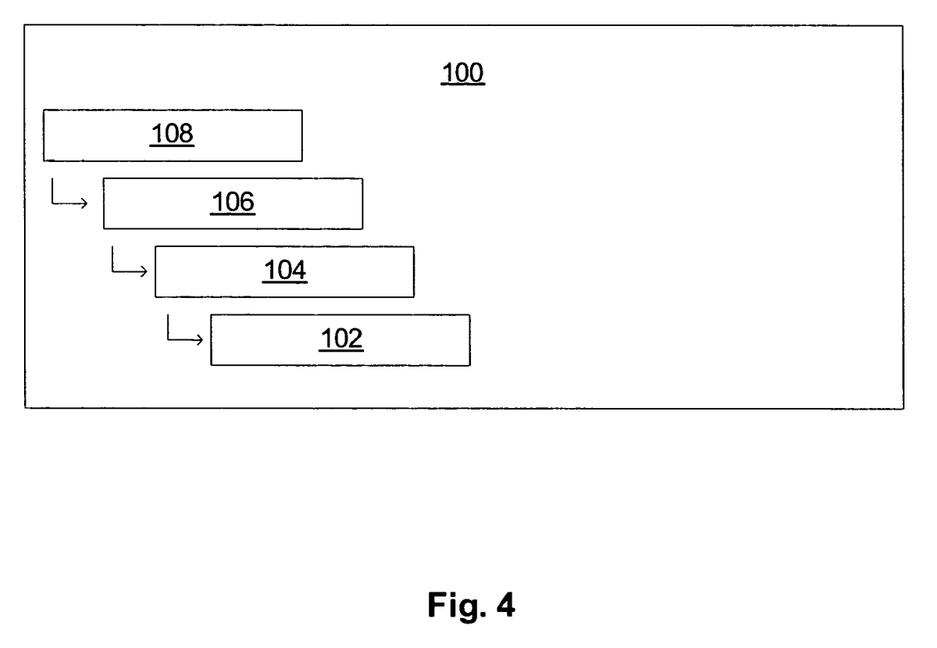
FIG. 4 is a schematic block diagram of data maintained by the font access level of FIG. 3.

FIG. 4 is a schematic block diagram showing font access level 100 in further detail. Font access level 100 employs RAM 65 of printer interface 50 to store locations in font table level 240 of activated fonts for use during character access. As illustrated in FIG. 4, up to four fonts may be activated by storage of their respective locations in variables 102, 104, 106 and 108 of RAM 65. Furthermore, variables 102, 104, 106 and 108 are subject to an access order during character access. As such, in terms of font access order, variable 108 is first, variable 106 is second, variable 104 is third and variable 102 is fourth.

Access to variables 102, 104, 106 and 108 according to the access order is controlled by microprocessor-readable program code handled by font access level 100 which is part of the printer interface firmware. The method executed by the program code will be described below.

Figure 5:
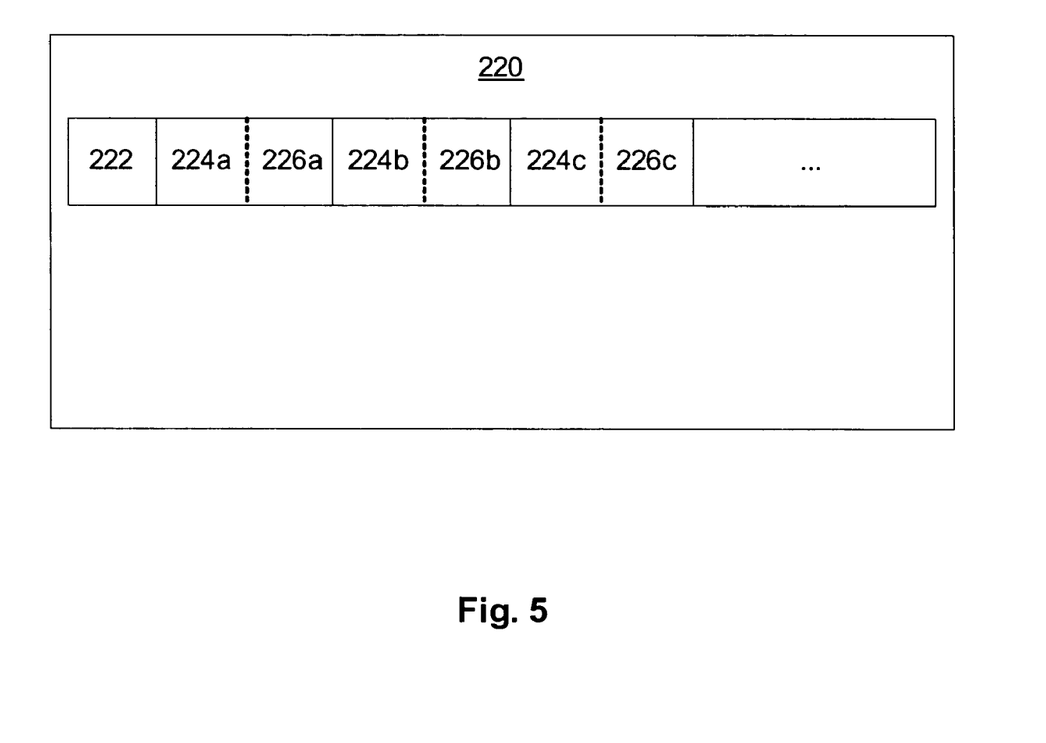
FIG. 5 is a schematic block diagram of data maintained by the font listing level of FIG. 3.

FIG. 5 is a schematic block diagram showing font listing level 220 in further detail. Font listing level 200 comprises a variable 222 for storing the number of fonts in the font table level, a number of variables 224 (shown as 224a, 224b and 224c etc.) for storing respective locations of the fonts, and a number of variables 226 (shown as 226a, 226b and 226c) for storing the fonts' respective availability statuses. A font's availability status can have one of the following values: "downloading", "complete" or "deleting". The availability status is an indicator as to whether a font is presently unavailable because it is being deleted or because it is still being downloaded.

Figure 6:
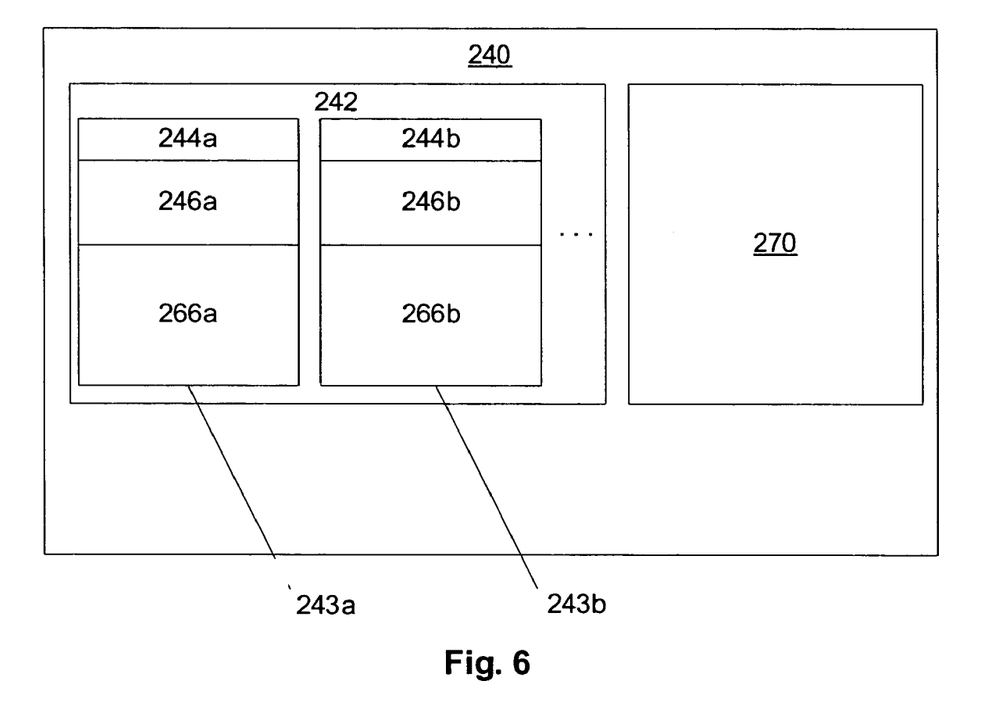
FIG. 6 is a schematic block diagram of data maintained by the font table level of FIG. 3, including a font header, a character index and character shape data.

FIG. 6 is a schematic block diagram showing font table level 240 in further detail. Font table level 240 comprises font table storage 242 and NAND sector processing data 270. Each font table 243 (shown as 243a, 243b etc.) in font table storage 242 comprises a font header 244, a character index 246 and character shape data 266. Font header 244 contains a font ID and a patch flag indicating whether the font has patch or non-patch status.

Figure 7:
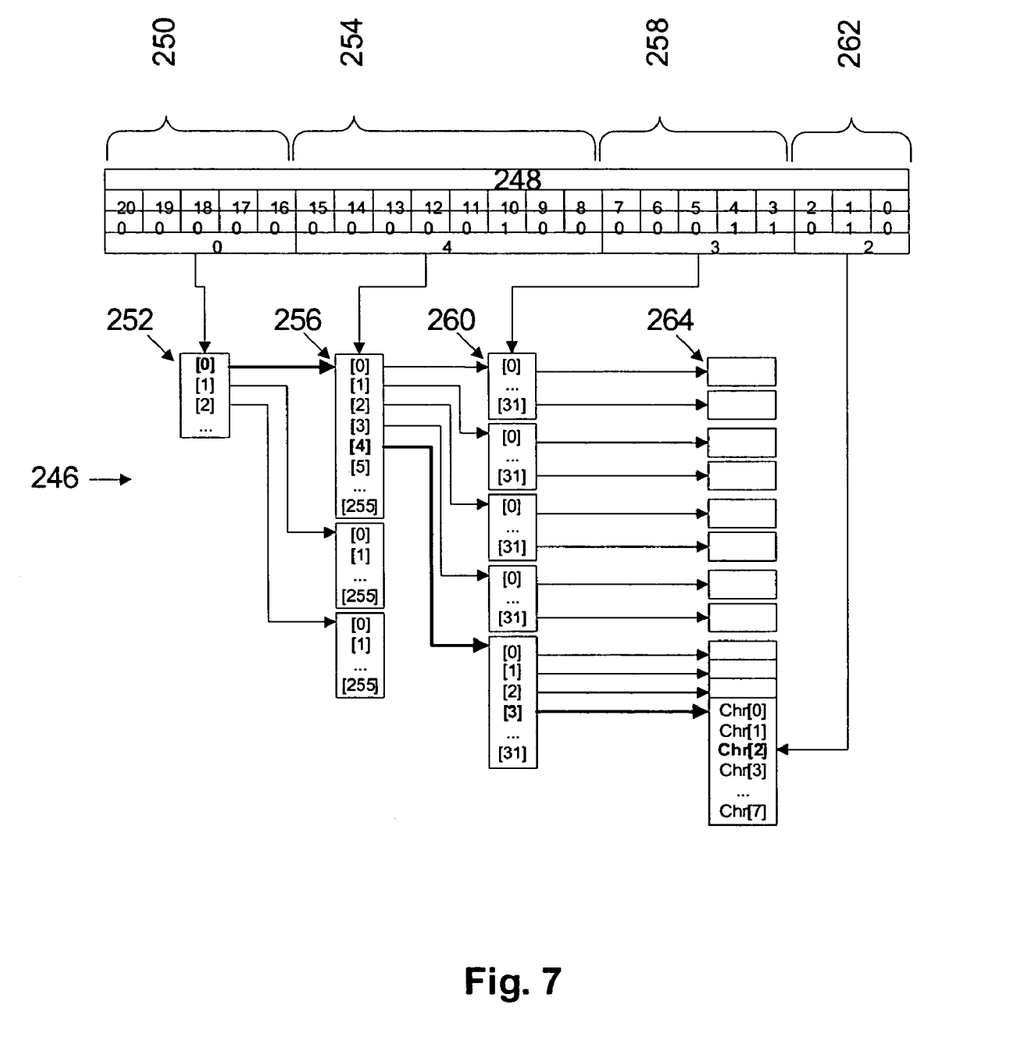
FIG. 7 is a schematic block diagram of a multiple-tier index and character segments of which the character index of FIG. 6 is comprised.

FIG. 7 is a conceptual block diagram showing character index index 246 of font table 243 in further detail. Character index 246 is a multi-tier index have sub-indices for which portions of a 21-bit Unicode character code 248 are used as keys. In particular, portion 250 of character code 248 is a key for subindex 252, portion 254 is a key for subindex 256, portion 258 is a key for subindex 260 and portion 262 is a key for character segment index 262.

The multiple-tier character index 246 enables font access level 100 to more quickly search a font to determine whether the character data corresponding to character code 248 exists in that font, than if the character index were a single tier requiring a serial search through every single font entry. Another key advantage of the multiple-tier index is that the index is much smaller than a single-tier because index entries for which there is no character data need not be stored.

The above-described system for managing multiple activated fonts each having a respective position in an access order is very flexible. This system is used to provide localized characters and font patches to correct character errors in fonts stored in font storage level 200, without the limitation of requiring complete character sets to be downloaded to printer interface 50. For the purposes of the following description, a base font is defined generally as a complete character set for printing in a language or languages. A localization font contains a subset of replacement characters for the base font that provide character adjustments suited for a particular locale using the language or languages. The base and localization fonts are selected prior to font activation by a user or automatically by host device 12 by providing to printer interface 50 a base font ID and a localization font ID. Upon receipt of the font IDs, font access level 100 initiates activation of the base and localization fonts. Font access level 100 also initiates activation of patch fonts for each of the base and localization fonts, as will be described below.

Figure 8:
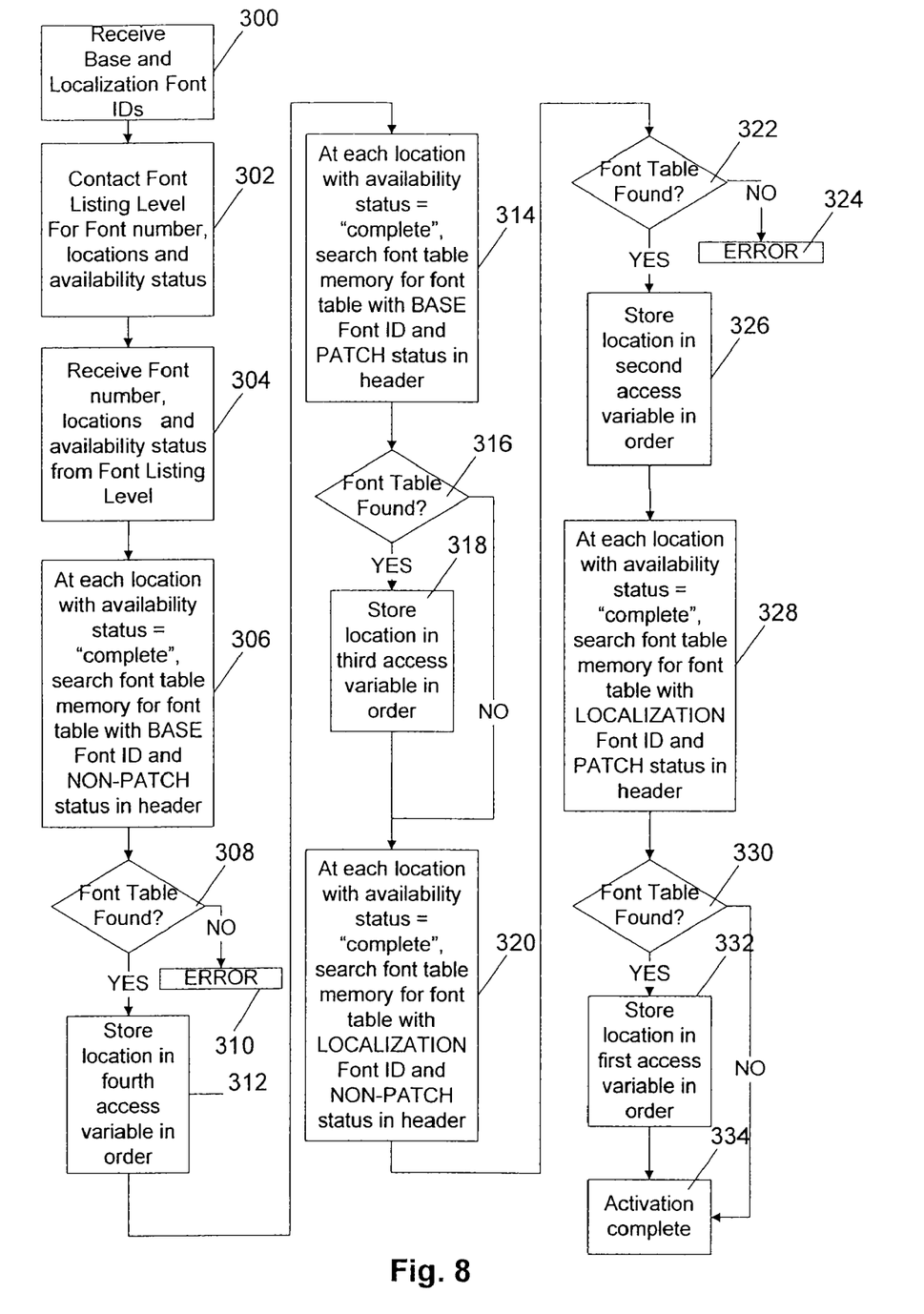
FIG. 8 is a flowchart showing the method of font activation used with the system of FIG. 3.

With reference to FIG. 8, during font activation, host device 12 selects a base font and a localization font and sends the base font ID and localization font ID to printer interface 50. Font access level 100 receives the base and localization font IDs (step 300). In response to receipt of the font IDs, font access level 100 contacts font listing level 220 for the number and locations in font table memory 240 of accessible fonts (step 302).

Font access level 100 receives from font listing level 220 the number of font locations from variable 222, all font locations from variables 224 and their respective availability statuses from variables 226 (step 304).

To retrieve the base font location, at each font location in variables 224 having availability statuses in variables 226 of "complete", font access level 100 searches font table memory 240 for a font header 244 containing the base font ID and having a non-patch status (step 306). When a match is found (step 308), the font location corresponding to the match is stored in font access variable 102, corresponding to the fourth access variable in the access order (step 312). If a font table having a font header 244 containing the base font ID and having a non-patch status is not found, an error is sent to host device 12 (step 310).

To retrieve the base font patch location (if any), at each font location in variables 224 having availability statuses in variables 226 of "complete", font access level 100 searches font table memory 240 for a font header 244 containing the base font ID and having a patch status (step 314). If a match is found, the font location corresponding to the match is stored in font access variable 104, corresponding to the third access variable in the access order (step 318). If no match is found, then a base font patch corresponding to the base font ID is assumed not to be stored in font table memory 240.

To retrieve the localization font location, at each font location in memory locations 124 having availability statuses in variables 226 of "complete", font access level 100 searches font table memory 240 for a font header 244 containing the localization font ID and having a non-patch status (step 320). If a match is found (step 322), the font location corresponding to the match is stored in font access variable 106, corresponding to the second access variable in the access order (step 326). If a font table having a font header 244 containing the localization font ID and having a non-patch status is not found, an error is sent to host device 12 (step 324).

To retrieve the localization font patch location (if any), at each font location in memory locations 224 having availability statuses in variables 226 of "complete", font access level 100 searches font table memory 240 for a font header 244 containing the localization font ID and having a patch status (step 328). If a match is found (step 330), the font location corresponding to the match is stored in font access variable 108, corresponding to the first access variable in the access order (step 332). If no match is found, then a localization font patch corresponding to the localization font ID is assumed not to be stored in font table memory 240.

Activation of fonts by population of variables 102, 104, 106 and 108 in font access level 100 is controlled by microprocessor-readable program code handling font listing level 220 and font access level 100.

After the locations have been stored, activation is considered complete and subsequent access to character data will use the activated fonts as described below. As described in general above, once the fonts have been activated by populating the variables 102,104,106 and 108 in printer interface RAM 65, a subsequent access to character data is carried out in accordance with the access order of memory areas 102, 104,106 and 108.

Figure 9:
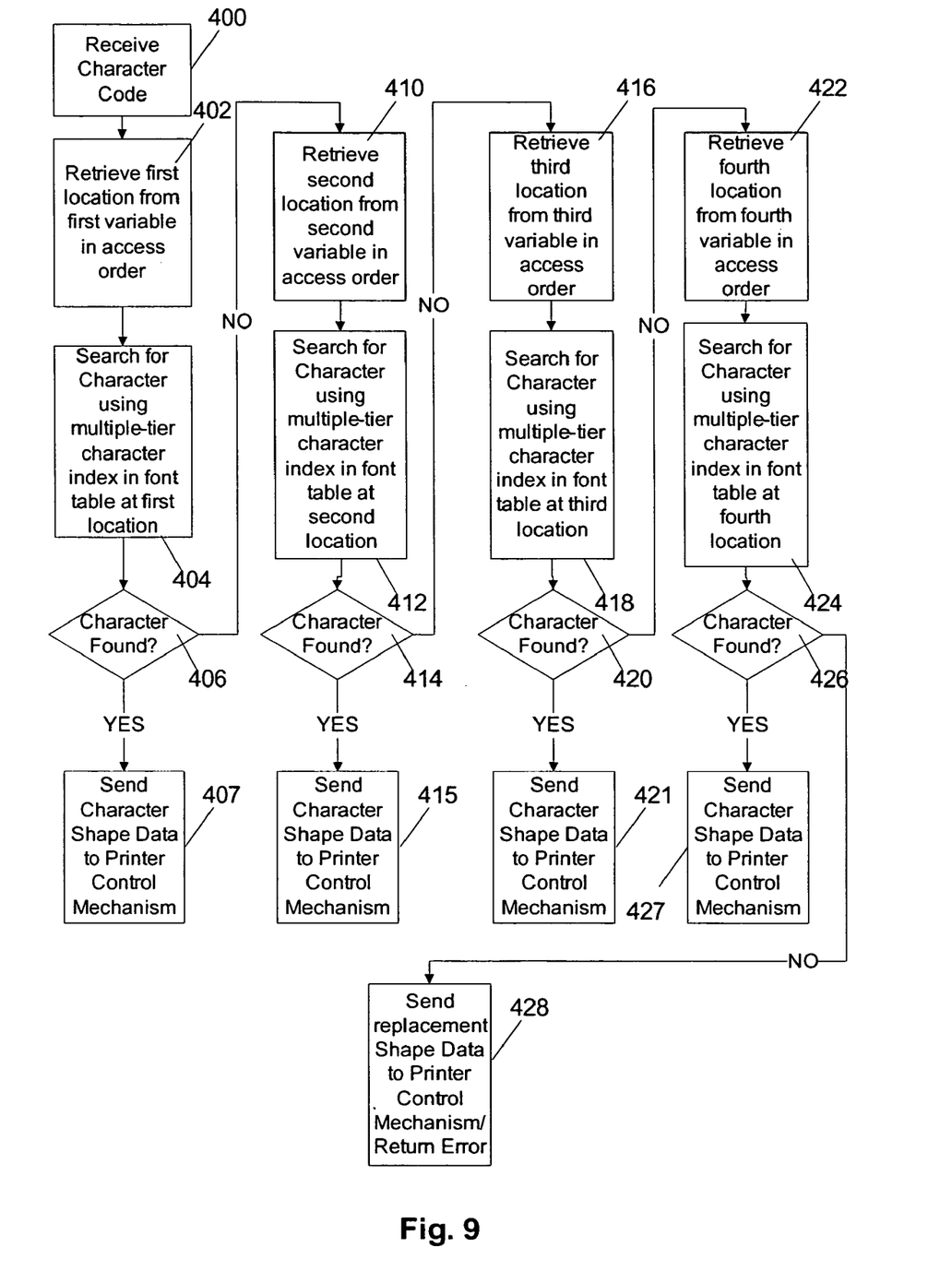
FIG. 9 is a flowchart showing the method of character retrieval used with the system of FIG. 3.

With reference to FIG. 9, during character access for a print job, font access level 100 receives a character code 248 (step 400). Font access level 100 then retrieves a first location from the first variable 108 in the font access order (step 402). The first location corresponds to the localization font patch. Using the first location, a search is conducted using the multiple-tier character index 246 in the font table 243 at the first location (step 404). If the character is found in the font table at the first location (step 406) then the character shape data from the font table at the first location is sent to the printer control mechanism 76 for output (step 407).

If the character is not yet found, font access level 100 then retrieves a second location from the second variable 106 in the font access order (step 410). The second location corresponds to the localization font. Using the second location, a search is conducted using the multiple-tier character index 246 in the font table 243 at the second location (step 412). If the character is found in the font table at the second location (step 414) then the character shape data from the font table at the second location is sent to the printer control mechanism 76 for output (step 415).

If the character is not yet found, font access level 100 then retrieves a third location from the third variable 104 in the font access order (step 416). The third location corresponds to the base font patch. Using the third location, a search is conducted using the multiple-tier character index 246 in the font table 243 at the third location (step 418). If the character is found in the font table at the third location (step 420) then the character shape data from the font table at the third location is sent to the printer control mechanism 76 for output (step 421).

If the character is still not yet found, font access level 100 then retrieves a fourth location from the fourth variable 104 in the font access order (step 422). The fourth location corresponds to the base font. Using the fourth location, a search is conducted using the multiple-tier character index 246 in the font table 243 at the fourth location (step 424). If the character is found in the font table at the fourth location (step 426) then the character shape data from the font table at the fourth location is sent to the printer control mechanism 76 for output (step 427).

If, at this stage, the character has not yet been found, either an error is returned to the host device 12 or shape data for a replacement character is sent to the printer control mechanism 76 (step 428). Other similar remedies for an unfound character would occur to one of ordinary skill in the art.

It will be understood that font access level 100 can provide from one to four activated fonts. As such, should solely variable 108 be populated with a font location, character searches are made only in that font. Should variables 108 and 106 be populated with respective font locations, a character search is made first in the font whose location is stored in variable 108 and if the character is not found in the first font then a character search is carried out next in the font whose location is stored in variable 106. If variable 104 is populated with a font location, the character search may continue in that font if the character has not yet been found. The same is true of a font whose location is stored in variable 102.

With reference again to FIG. 7, navigation of the multiple-tier character index 246 during character access will now be described.

The first five bits 250 (bits 20-16) in character code 248 are "00000", which key to position "[0]" in subindex 252. The value at position "[0]" in subindex 252 is a pointer to a particular area of subindex 256. The next eight bits 254 (bits 15-8) in character code 248 are "00000100", which key to position "[4]" in the particular area of subindex 256. The value at position "[4]" in the particular area of subindex 256 is a pointer to a particular area of subindex 260. The next five bits (bits 7-3) in character code 248 are "00011", which key to position "[3]" in the particular area of subindex 260. The value at position "[3]" in the particular area of subindex 260 is a pointer to a particular character segment in character segment index 262. The next three bits (bits 2-0) in character code 248 are "010", which key to position "Chr[2]" in the particular character segment in character segment index 262. The data immediately following position "Chr[2]" in the character segment index 262 is the desired character's shape data.

As described above, using a multi-tier character index 246, font access level 100 can quickly determine that character data corresponding to character code 248 does not exist in an activated font, and can thereby search another activated font whose location is stored in the font access variable next in the access order. While also being efficient, the multiple-tier index is compact.

Although specific reference is made to a printer used in a POS station, those of skill in the art will appreciate that this is for ease of illustration. The multiple font management method is suitable for use with virtually any type of printer such as for example dot matrix printers, thermal printers, ink jet printers, laser printer etc.

Furthermore, although the preferred embodiment of the multiple font management system of the invention has been described as being resident on printer interface board 50, it could be implemented entirely on printer 52, with only minor modifications. As a further alternative, font access level 100 could be implemented on printer interface board 50, while font storage level 200 could be implemented on printer 52. As such, the appended claims make reference to a printing device, rather than solely a printer interface, or solely a printer, in order to refer to the variations and alternatives described above.

Although embodiments have been described, those of skill in the art will appreciate that the variations and modifications may be made without departing from the spirit and scope of the invention as defined by the appended claims.

What is claimed is:

1. A method of managing multiple fonts in a printing device, wherein said multiple fonts are stored within a font-storage memory of said printing device, the method comprising the following steps:
   (a) activating a first font from said font-storage memory by storing a first font location of said first font in a first font-access memory, said first font-access-memory being first in a font access order, said first font including a first plurality of characters each identified by a corresponding first character index;
   (b) activating a second font from said font-storage memory by storing a second font location of said second font in a second font-access memory, said second font-access memory being second in said font access order, said second font including a second plurality of characters each identified by a corresponding second character index; and
   (c) requesting and receiving a character index;
   wherein upon receiving said requested character index:
   determining if the requested character index matches any of said first character indices, if a match is found, then outputting the character within said first font that corresponds to the matched first character index;
   else determining if the requested character index matches any of said second character indices, if a match is found, then outputting the character within said second font that corresponding to the matched second character index;
   wherein said second font is a complete character set, and said first font is a partial character set, said partial character set being a subset of said complete character set, and each character within said partial character set having a corresponding character within said complete character set.

2. The method of claim 1, further comprising:
   prior to step (a), receiving from a host device, a first font ID identifying said first font and receiving a second font ID identifying said second font; and
   determining said location of said first font using said first font ID; and
   determining said location of said second font using said second font ID.

3. The method of claim 1, wherein the first character index of each character within said partial character set matching the second character index of its corresponding character within said complete character set.

4. The method of claim 1, wherein each character within said partial character set defines a printed image different than its corresponding character within said complete character set.

5. A method of managing multiple fonts in a printing device, wherein said multiple fonts are stored within a font-storage memory of said printing device, the method comprising the following steps:
   (a) activating a first font from said font-storage memory by storing a first font location of said first font in a first font-access memory, said first font-access memory being first in a font access order, said first font including a first plurality of characters each identified by a corresponding first character index;
   (b) activating a second font from said font-storage memory by storing a second font location of said second font in a second font-access memory, said second font-access memory being second in said font access order, said second font including a second plurality of characters each identified by a corresponding second character index; and
   (c) requesting and receiving a character index;
   wherein upon receiving said requested character index:
   determining if the requested character index matches any of said first character indices, if a match is found, then outputting the character within said first font that corresponds to the matched first character index;
   else determining if the requested character index matches any of said second character indices, if a match is found, then outputting the character within said second font that corresponding to the matched second character index;
   wherein said second font is a base font and said first font is a base-patch font, said base-patch font being a subset of said base font and consisting of revised base characters to replace corresponding original base characters within said base font, as determined by said first character index of each revised base character matching the second character indexed of its corresponding original base character.

6. The method of claim 5, further comprising:
   (d) activating a third font from said font-storage memory by storing a third font location of said third font in a third font-access memory, said third font-access memory being third in said access order, said third font including a third plurality of characters each identified by a third corresponding character index.

7. The method of claim 6, wherein:
   said third font is a third character set;
   said second font is a second character set; and
   said first font is a first character set, said first character set being subset of said second character set, and the first character index of each character within said first character set matching the second character index of its corresponding character within said second character set.

8. The method of claim 7, wherein:
   said first font is identified by a first font ID and a first status indictor identifying it as a subset of characters;
   said second font is identified by said first font ID and a second status indicator identifying it as not a sub-set of characters; and
   said third font is identified by a second font ID;
   said method, further comprising:
   prior to step (a), receiving from a host device, said first font ID and said second font ID;
   determining said location of said first font using both said first font ID and said first status indicator;
   determining said location of said second font using both said first font ID and said second status indicator; and
   determining said location of said third font using said second font ID.

9. The method of claim 7, further comprising:
   (e) activating a fourth font from said font-storage memory by storing a fourth font location of said fourth font in a fourth font-access memory, said fourth font including a fourth plurality of characters each identified by a fourth corresponding character index, said fourth font being a fourth character set;
   wherein:
   said third character set is a sub-set of said fourth character set, and the third character index of each character within said third character set matches the fourth character index of its corresponding character within said fourth character set;
   said second character set is a sub-set of said fourth character set, and the second character index of each character within said second character set matches the fourth character index of its corresponding character within said fourth character set.

10. The method of claim 9, wherein:
said first font is identified by a first font ID and a first status indicator identifying it as a subset of characters;
said second font is identified by said first font ID and a second status indicator identifying it a: not sub-set of characters;
said third font is identified by a second font ID and a third status indicator identifying it as a subset of characters; and
said fourth font is identified by said second font ID and a fourth status indicator identifying it as riot a sub-set of characters.

11. The method of claim 9, wherein if the requested character index does not match any of said second character indices, then:
determining if the requested character index matches any of said third character indices, if a match is found, then outputting the character within said third font that corresponding to the matched third character index;
else determining if the requested character index matches any of said fourth character indices, if a match is found, then outputting the character within said fourth font that corresponding to the matched fourth character index.

12. The method of claim 10, further comprising the following steps prior to step (a):
(i) receiving from a host device, said first font ID and said second font; and
(ii) determining said location of said first font using both said first font ID and said first status indicator;
(iii) determining said location of said second font using said first font ID and said second status indicator;
(iv) determining said location of said third font using said second font ID and said third status indicator; and
(v) determining said location of said fourth font using said second font ID and said fourth status indicator.

13. The method of claim 10, wherein:
said fourth font is a base font including a complete character set;
said third font is a base-patch font, said base-patch font being a subset of said base font and consisting of revised base characters to replace corresponding original base characters within said base font, each revised base character correcting an error in the representation of its corresponding original base character;
said second font is a localization font, said localization font being a subset of said base font and consisting of alternate representation characters to replace corresponding original base characters within said base font, each alternate representation character being a valid alternate representation of its corresponding original base character; and
said first font is a localization-patch font, said localization-patch font being a subset of said localization font and consisting of revised localization characters to replace corresponding original localization characters within said localization font, each revised localization character correcting an error in the representation of its corresponding original localization character.

14. The method of claim 12, further comprising:
retrieving addresses of valid font tables in said font-storage memory from a font listing memory;
in step (ii), searching font tables in said font-storage memory at each of said addresses until a font header containing both said first font ID and said first status indicator is located;
in step (iii), searching font tables in said font-storage memory at each of said addresses until a font header containing both said first font ID and said second status indicator is located;
in step (iv), searching font tables in said font-storage memory at each of said addresses until a font header containing both said second font ID and said third status indicator is located; and
in step (v), searching font tables in said font-storage memory at each of said addresses until a font header containing both said second font ID and said fourth status indicator is located.

15. A system for managing multiple fonts in a printing device, said system comprising:
a plurality of activation-memory locations for activating a font whose address location is stored within said activation-memory locations, each activation-memory location having a fixed and non-overlapping access priority relative to each other;
wherein all of said multiple fonts have characters identified by character index, and all fonts whose address location is stored within any of said plurality of activation-memory locations have at least one character index in common;
a processing device that responds to receiving a character index identifying a requested character by:
searching for said character index first within a first activated font whose address is stored in the highest access priority activation-memory location, and
if said processing unit locates said character index within said first activated font, then said processing unit returns the character within said first activated font corresponding to said character unit;
else
(a) said processing unit identifies the next activation-memory location having the next lower priority;
(b) said processing unit searching for said character index within a next activated font whose address is stored in said next activation-memory location;
(c) if said processing unit locates said character index within said next activated font, then said processing unit returns the character within said next activated font corresponding to said character unit;
else said processing unit determines if all activation-memory locations have been accessed, if not then said processing unit returns to step (a), else said processing unit indicates that the requested font was not found.

* * * * *

UNITED STATES PATENT AND TRADEMARK OFFICE
CERTIFICATE OF CORRECTION

| | | |
|---|---|---|
| PATENT NO. | : 7,583,393 B2 | Page 1 of 1 |
| APPLICATION NO. | : 10/949870 | |
| DATED | : September 1, 2009 | |
| INVENTOR(S) | : Leonard B. Hodder et al. | |

It is certified that error appears in the above-identified patent and that said Letters Patent is hereby corrected as shown below:

<u>Column 11</u>

Line 8, please change, "it a: not" to --it as not a-- and

Line 14, please change "as riot" to --as not--.

Signed and Sealed this

Twenty-fourth Day of November, 2009

David J. Kappos
*Director of the United States Patent and Trademark Office*